(12) United States Patent
Yu

(10) Patent No.: US 10,728,405 B2
(45) Date of Patent: Jul. 28, 2020

(54) DISPLAY, SERVER, CONTROL PROGRAM FOR DISPLAY, AND CONTROL PROGRAM FOR SERVER

(71) Applicant: KONICA MINOLTA, INC., Chiyoda-ku, Tokyo (JP)

(72) Inventor: Kazutoshi Yu, Kobe (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/379,911

(22) Filed: Apr. 10, 2019

(65) Prior Publication Data

US 2019/0327373 A1 Oct. 24, 2019

(30) Foreign Application Priority Data

Apr. 24, 2018 (JP) .................................. 2018-082683

(51) Int. Cl.
*H04N 1/00* (2006.01)
*G06F 40/58* (2020.01)

(52) U.S. Cl.
CPC ......... *H04N 1/00498* (2013.01); *G06F 40/58* (2020.01); *H04N 1/00413* (2013.01); *H04N 1/00501* (2013.01)

(58) Field of Classification Search
CPC ................................................ H04N 1/00498
USPC ....................................................... 358/1.15
See application file for complete search history.

(56) References Cited

U.S. PATENT DOCUMENTS

2015/0309996 A1* 10/2015 Han .................... G06K 9/00442
704/2
2016/0352936 A1* 12/2016 Kanbayashi ....... H04N 1/00344
2019/0220521 A1* 7/2019 Uchida ............ H04M 3/42229

FOREIGN PATENT DOCUMENTS

JP 2006212893 A 8/2006
JP 2016221800 A 12/2016

* cited by examiner

*Primary Examiner* — Jacky X Zheng
(74) *Attorney, Agent, or Firm* — Buchanan Ingersoll & Rooney PC

(57) ABSTRACT

A display capable of communicating with a server includes: an auxiliary storage that stores character information of a specific language, the character information including a character string contained in a screen when the screen is displayed; an acceptor that accepts selection of a language to be used in displaying the screen; a receiver that receives a translation result obtained by translating the character information of the specific language into a new language from the server when the language, selection of which has been accepted by the acceptor, is the new language different from the specific language; a hardware processor that stores, in the auxiliary storage, character information of the new language, the character information being created based on the translation result received by the receiver; and a display part that displays the screen based on the character information of the new language.

14 Claims, 17 Drawing Sheets

LANGUAGE TABLE

| TEXT ID | JAPANESE | ENGLISH | FRENCH |
|---|---|---|---|
| 1 | OKINIIRI | Favorite Setting | Réglage favori |
| 2 | HYOUJUNSETTEI | Default Setting | Paramètres par défaut |
| 3 | TSUIKA | Add... | Ajouter... |
| 4 | HENSHUU | Edit... | Modifier... |
| 5 | GENKOUNOMUKI | Original Orientation | Orientation originale |
| 6 | TATE | Portrait | Portrait |
| 7 | YOKO | Landscape | Paysage |
| ... | ... | ... | ... |

FIG. 4

LANGUAGE-SYSTEM TABLE

| INDO-EUROPEAN LANGUAGE FAMILY GERMANIC | INDO-EUROPEAN LANGUAGE FAMILY ITALIC | JAPANESE LANGUAGE FAMILY |
|---|---|---|
| DANISH<br>SWEDISH<br>ICELANDIC<br>FAROESE<br>NORWEGIAN<br>ENGLISH<br>FRISIAN<br>GERMAN | ITALIAN<br>FRENCH<br>SPANISH<br>PORTUGUESE<br>ROMANIAN | JAPANESE |

FIG. 5

LANGUAGE SETTING ✕

LANGUAGE

AUTO ⌄

AUTO

ENGLISH (COMMON)
FRENCH
GERMAN
ITALIAN
SPANISH
CHINESE (TRADITIONAL / FOR TAIWAN)
CHINESE (SIMPLIFIED / FOR MAINLAND)
KOREAN
JAPANESE

| TRANSLATION-DESTINATION SETTING | OK | CANCEL |

LANGUAGE TABLE

| TEXT ID | JAPANESE | ENGLISH | FRENCH | GERMAN |
|---|---|---|---|---|
| 1 | OKINIIRI | Favorite Setting | Réglage favori | Lieblingseinstellung |
| 2 | HYOUJUNSETTEI | Default Setting | Paramètres par défaut | Standardeinstellung |
| 3 | TSUIKA | Add... | Ajouter... | Hinzufügen... |
| 4 | HENSHUU | Edit... | Modifier... | Bearbeiten... |
| 5 | GENKOUNOMUKI | Original Orientation | Orientation originale | Ursprüngliche Orientierung |
| 6 | TATE | Portrait | Portrait | Porträt |
| 7 | YOKO | Landscape | Paysage | Landschaft |
| ... | ... | ... | ... | ... |

UPD PRINT SETTING                                           SC4  ✕

| My Tab | De base | Disposition | Finition | Mode Couverture | Tampon/Composition | Qualité | Autres |

Réglage favori
Sans titre  ⌄   Ajouter...   Modifier...

Orientation original
◉ Portrait
○ Paysage

Type de sortie
■ Impression   ⌄

Format original
A4   ⌄

Réglage Utilisateur...

⇨ Format papier
Identique au format original   ⌄

Authentif./Suivi de volume...

Copies
1   [1..9999]

Zoom[25..400%]
◉ Auto
○ Manuel   100   %

☑ Tri
☐ Décalage

Magasin
Auto   ⌄

Type de papier
Papier ordinaire   ⌄

Réglages papier par magasin...

A4 (210×297mm)
▼
A4 (210×297mm)

×1

Aperçu Imprimante   Infos imprimante

Par défaut

OK   CANCEL   APPLY(A)   HELP

DISPLAY, SERVER, CONTROL PROGRAM FOR DISPLAY, AND CONTROL PROGRAM FOR SERVER

The entire disclosure of Japanese patent Application No. 2018-082683, filed on Apr. 24, 2018, is incorporated herein by reference in its entirety.

BACKGROUND

Technological Field

The present invention relates to a display, a server, a control program for the display, and a control program for the server. More specifically, the invention relates to a display, a server, a control program for the display, and a control program for the server that are capable of improving convenience in displaying a screen.

Description of the Related Art

Examples of electrophotographic image forming apparatuses include multi function peripherals (MFPs), facsimile apparatuses, copiers, and printers. The MFPs have a scanner function, a facsimile function, a copying function, a printer function, a data communication function, and a server function.

In general, an image forming apparatus forms a toner image by developing an electrostatic latent image formed on an image carrier with a developing device, transfers the toner image to a recording medium, and fixes the toner image oil paper with a fixing device. In such a way, the image forming apparatus forms an image on the recording medium. In addition, some image forming apparatuses form a toner image by developing an electrostatic latent image formed on a photoreceptor with a developing device, transfer the toner image onto an intermediate transfer belt with a primly transfer roller, and secondarily transfer the toner image on the intermediate transfer belt onto the recording medium with a secondary transfer roller.

In order to control and operate the image forming apparatus from an external device such as a personal computer (PC) and a mobile terminal, a printer driver compliant with the external device is required to be installed in the external device. When performing printing with the image forming apparatus, the user of the external device causes the external device to display an operation screen for the printer driver, and performs operations through the operation screen.

Generally, the printer driver contains a language table. Character information is described in the language table. The character information contains a character string, which is contained in the screen for the printer driver when the screen for the printer driver is displayed. The external device to which the printer driver is installed accepts selection of a language to be used when the printer driver is installed or activated, and displays a character string contained in an operation screen for the printer driver in the selected language.

In order to inhibit a data size of the printer driver from increasing, the language table contains only character information of major languages (e.g., Japanese, English, German, and French) which are likely to be used, and does not contain character information of other languages. For this reason, a user whose native language is other than the major languages cannot use the printer driver, and has a problem of low convenience in displaying the screen.

For example, JP 2016-221800 A and JP 2006-212893 A propose a technique for translating a screen to be displayed by using external translation service. JP 2016-221800 A discloses a technique. In the technique, when an image selected by a user contains a character string of a first language, an external translation server is caused to perform translation to convert a character code string of the first language into a character code siring of a second language.

JP 2006-212893 A discloses a technique. In the technique, when a language is selected with a remote panel screen including an operation panel image for a printer displayed on a web browser, translation is performed by using external translation service which is a function of the web browser, and translated text is displayed at a predetermined position on the remote panel screen.

Unfortunately, the techniques of JP 2016-221800 A and JP 2006-212893 A cause increase in a communication amount since communication with an external translation server occurs at each time when the display of a screen in a selected language is required. As a result, there has been a problem of low display response and low convenience in displaying a screen.

It should be noted that the low convenience in displaying a screen can occur not only when the operation screen for the printer driver is displayed but also when any screen is displayed.

SUMMARY

The invention is to solve the above-described problems, and an object of the invention is to provide a display, a server, a control program for the display, and a control program for the server that are capable of improving convenience in displaying a screen.

To achieve the abovementioned object, according to an aspect of the present invention, there is provided a display capable of communicating with a server, and the display reflecting one aspect of the present invention comprises: an auxiliary storage that stores character information of a specific language, the character information including a character string contained in a screen when the screen is displayed; an acceptor that accepts selection of a language to be used in displaying the screen; a receiver that receives a translation result obtained by translating the character information of the specific language into a new language from tile server when the language, selection of which has been accepted by the acceptor, is the new language different from the specific language; a hardware processor that stores, in the auxiliary storage, character information of the new language, the character information being created based on the translation result received by the receiver; and a display part that displays the screen based on the character information of the new language.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 illustrates an operation screen for a printer driver displayed on a display unit in the first embodiment of the invention;

FIG. 3 schematically illustrates a language table contained in a default printer driver in the first embodiment of the invention;

FIG. 4 schematically illustrates a language-system table contained in the printer driver in the first embodiment of the invention;

FIG. 5 illustrates a language setting screen displayed on the display unit in the first embodiment of the invention;

FIG. 6 illustrates an operation screen for the printer driver to be displayed on the display unit when English is selected as a language to be used, in the first embodiment of the invention;

FIG. 8 schematically illustrates a language table after character information of German is added in the first embodiment of the invention;

FIG. 9 illustrates an operation screen for the printer driver to be displayed on the display unit when a language to be used is changed to German, in the first embodiment of the invention;

FIG. 10 illustrates an operation screen for the printer driver to be displayed on the display unit when Italian is selected, as a language to be used, in the first embodiment of the invention;

DETAILED DESCRIPTION OF EMBODIMENTS

Hereinafter, one or more embodiments of the present invention will be described with reference to the drawings. However, the scope of the invention is not limited to the disclosed embodiments.

In the following embodiments, a display that is a personal computer (PC) will be described. In addition to PCs, the display may be, for example, a mobile terminal. The display may display any screen other than an operation screen for a printer driver.

First Embodiment

The configuration of a PC 100 in the embodiment will first be described.

Figure 1:
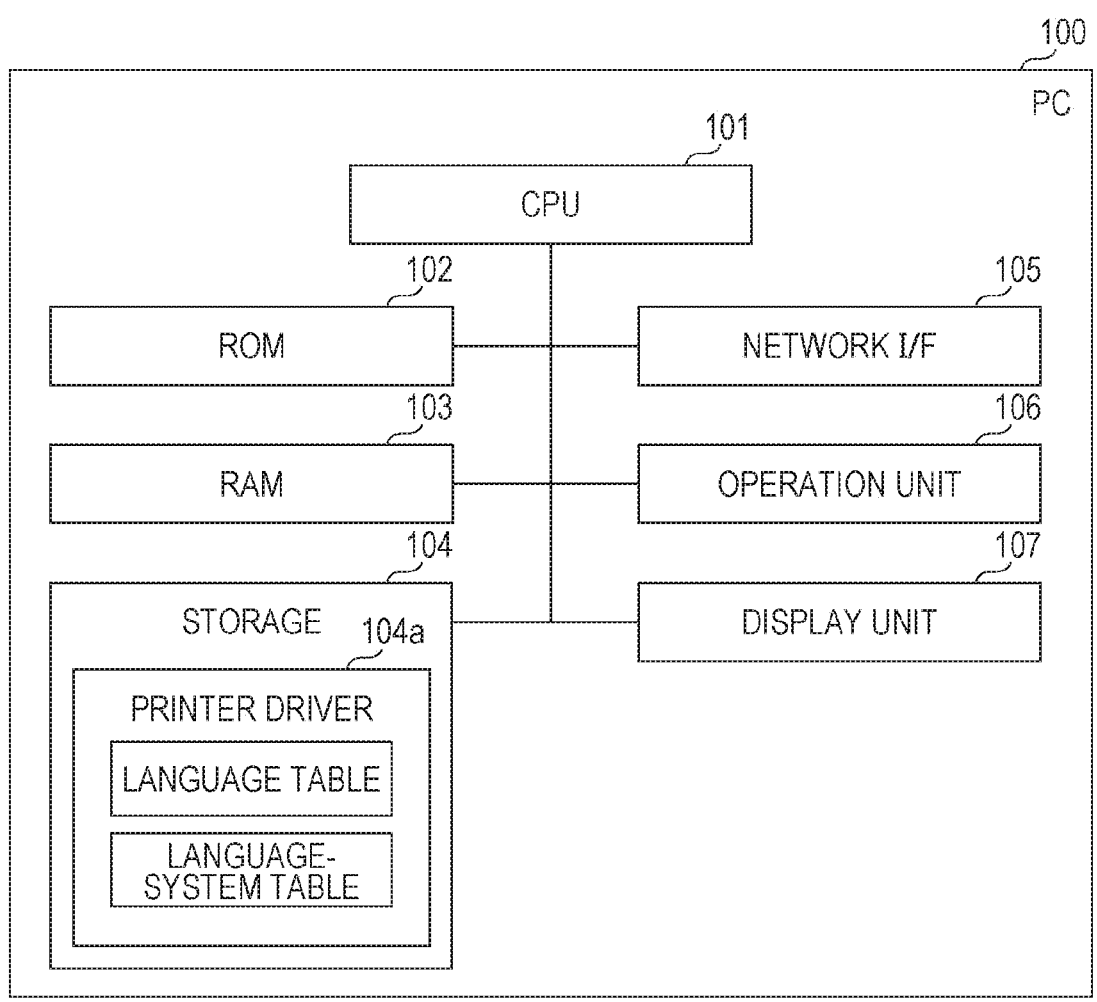
FIG. 1 is a block diagram illustrating the configuration of a PC in a first embodiment of the invention.

FIG. 1 is a block diagram illustrating the configuration of the PC 100 in a first embodiment of the invention.

Referring to FIG. 1, the PC 100 includes a central processing unit (CPU) 101, a read only memory (ROM) 102, a random access memory (RAM) 103, a storage 104, a network interface 105, an operation unit 106, and a display unit 107. The PC 100 is one example of a display. The CPU 101 is one example of a storage part, an updater, a determiner, and a format changer. The storage 104 is one example of an auxiliary storage. The network interface 105 is one example of a receiver, a requestor, a re-requestor, a re-receiver, and a requirer. The operation unit 106 is one example of an acceptor. The display unit 107 is one example of a display part and, other display parts.

The CPU 101 controls the entire PC 100. The CPU 101 operates by executing a program stored in the ROM 102 and the storage 104.

The ROM 102 stores a program for operating the CPU 101.

The RAM 103 temporarily stores data necessary for the CPU 101 to operate the program.

The storage 104 includes an auxiliary storage such as a hard disk drive (HDD), and stores various pieces of data such as a printer driver 104a.

The network interface 105 communicates with an external device through, for example, an intranet and the Internet.

The operation unit 106 accepts various operations.

The display unit 107 displays various pieces of information such as an operation screen for a printer driver.

Figure 2:
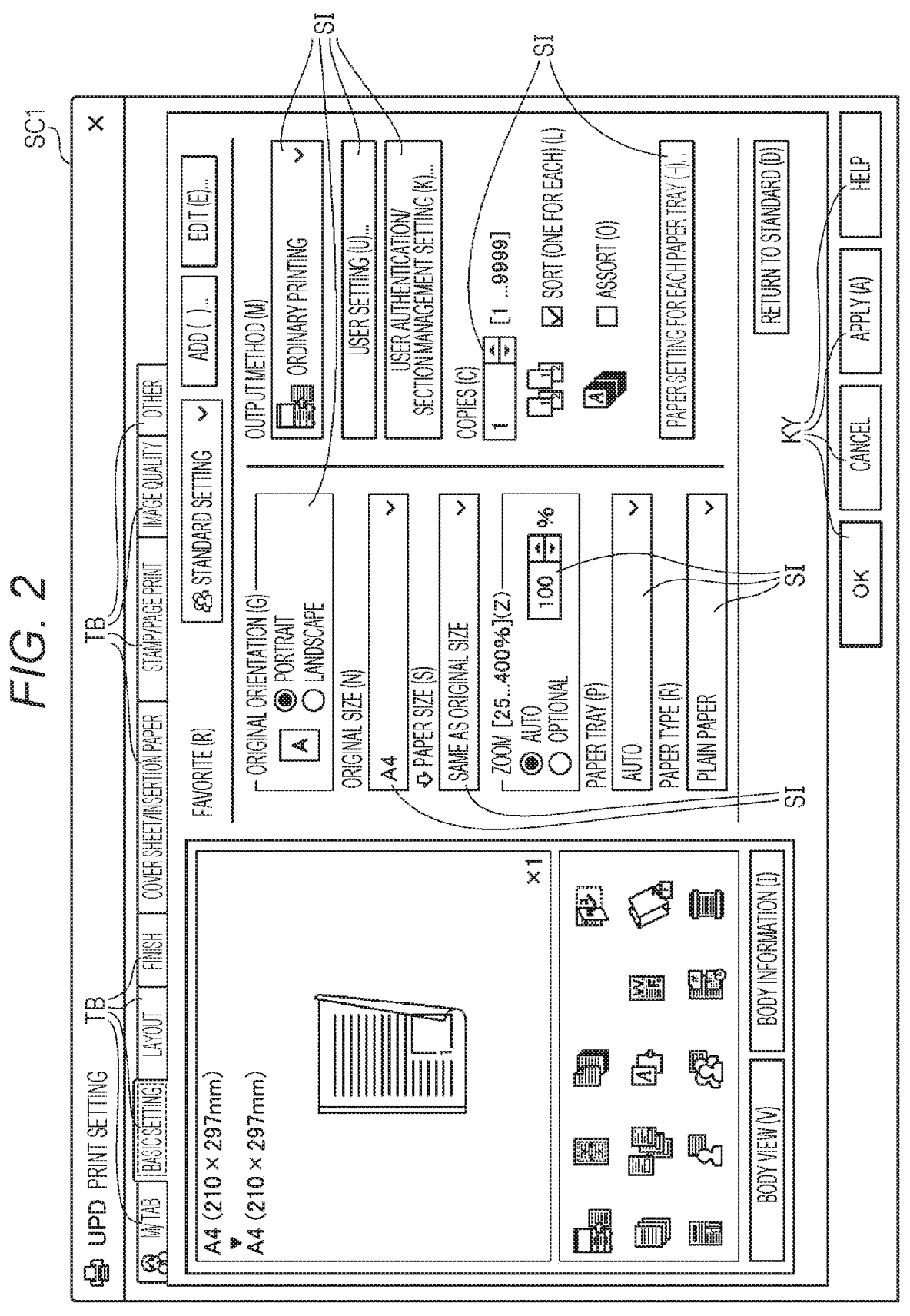

FIG. 2 illustrates an operation screen SC1 for the printer driver displayed on the display unit 107 in the first embodiment of the invention.

Referring to FIG. 2, when accepting a predetermined operation through the operation unit 106, the CPU 101 activates the printer driver, and displays the operation screen for the printer driver on the display unit 107 of the PC 100 in a default language (here Japanese).

The operation screen for the printer driver includes a plurality or tabs TB for switching to an operation screen to be displayed among a plurality of operation screens which accept setting for printing conditions. The operation screen SC1 among the operation screens for the printer driver is displayed when a tab TB of "Basic Setting" is depressed. The operation screen SC1 accepts basic setting for printing conditions. The operation screen SC1 includes a plurality of setting items SI for printing conditions and a plurality of keys KY. The setting items SI include "Original Orientation", "Original Size", "Paper Size", "Zoom", "Paper Feeding Tray", and "Paper Type". The keys KY include "OK", "Cancel", and "Help".

When accepting depression of the key KY of "OK", the CPU 101 generates a print job based on a printing condition set on the operation screen for the printer driver, and transmits the generated print job to an image forming apparatus (not illustrated).

In addition, when accepting depression of a specific key (here, key (not illustrated) of "Original Setting" in an operation screen to be displayed when a tab TB of "Other" is depressed) in the operation screen for the printer driver, the CPU 101 displays a language setting screen illustrated in FIG. 5, and accepts language change. This will be described later.

FIG. 3 schematically illustrates a language table contained in the default printer driver 104a in the first embodiment of the invention.

Referring to FIGS. 2 and 3, the language table contains character information. The character information contains a character string, which is contained in the operation screen for the printer driver when the operation screen for the printer driver is displayed. In the language table, character information in a specific language is described. In the language table, a text identification (ID) and a character are associated with each other. The text ID is used for identifying information contained in the operation screen for the printer driver. The character is obtained by representing the information identified by the text ID in a specific language.

In the embodiment, character information of a plurality of kinds of languages: Japanese; English; and French are described in the default language table. Specifically, the language table indicates that information having a text ID of "7" corresponds to "Yoko" in Japanese, "Landscape" in English, and "Passage" in French.

The language (here, Japanese, English, and French) in which character information is described in the default language table will hereinafter sometimes be referred to as a basic language (one example of the specific language).

FIG. 4 schematically illustrates a language-system table contained in the printer driver 104a in the first embodiment of the invention.

A language belonging to the same language system as that of the basic language is described in the language-system table. The language-system table is stored in the storage 104. Specifically, as well as languages such as Danish, Swedish, and Icelandic, is found to belong to a language system of the Germanic of the Indo-European language family. French, as well as languages such as Italian and Spanish, is found to belong to a language system of the Italic of the Indo-European language family. It is found that no language that belongs to the same language system as that of Japanese exists, and Japanese belongs to a language system of Japanese language family.

The operation of the PC 100 in the embodiment will then be described.

When accepting a predetermined operation on the operation screen for the printer driver (e.g., accepting depression of a "Language Setting" key contained in the operation screen of the tab TB of "Other" in FIG. 2), the CPU 101 displays the language setting screen illustrated in FIG. 5.

FIG. 5 illustrates the language setting screen displayed on the display unit 107 in the first embodiment of the invention.

Referring to FIG. 5, the language setting screen is used for accepting selection of a language that is used for displaying the operation screen for the printer driver. The language setting screen includes language options, an "OK" key KY1, a "Cancel" key KY2, and a "Translation-Destination Setting" key KY3. The language options include English, French, German, and Italian. The "OK" key KY1 is used for confirming the selection. The "Cancel" key KY2 is used for returning from the language setting screen to the operation screen.

When accepting depression of the "OK" key KY1 with a language selected from the options, the CPU 101 accepts the selection of a language that is used for displaying the operation screen for the printer driver. When accepting the selection of the language to be used, the CPU 101 performs language change in different ways depending on whether the character information of the selected language is contained in the language table.

The language options in the language setting screen can include any language. When an option of "Auto" is selected in the language setting screen, a language to be used in the PC 100, to which the printer driver is installed, is selected.

(Case Where Character Information of Selected Language is Contained in Language Table)

A case where English is selected as a language to be used will here be described.

Figure 6:
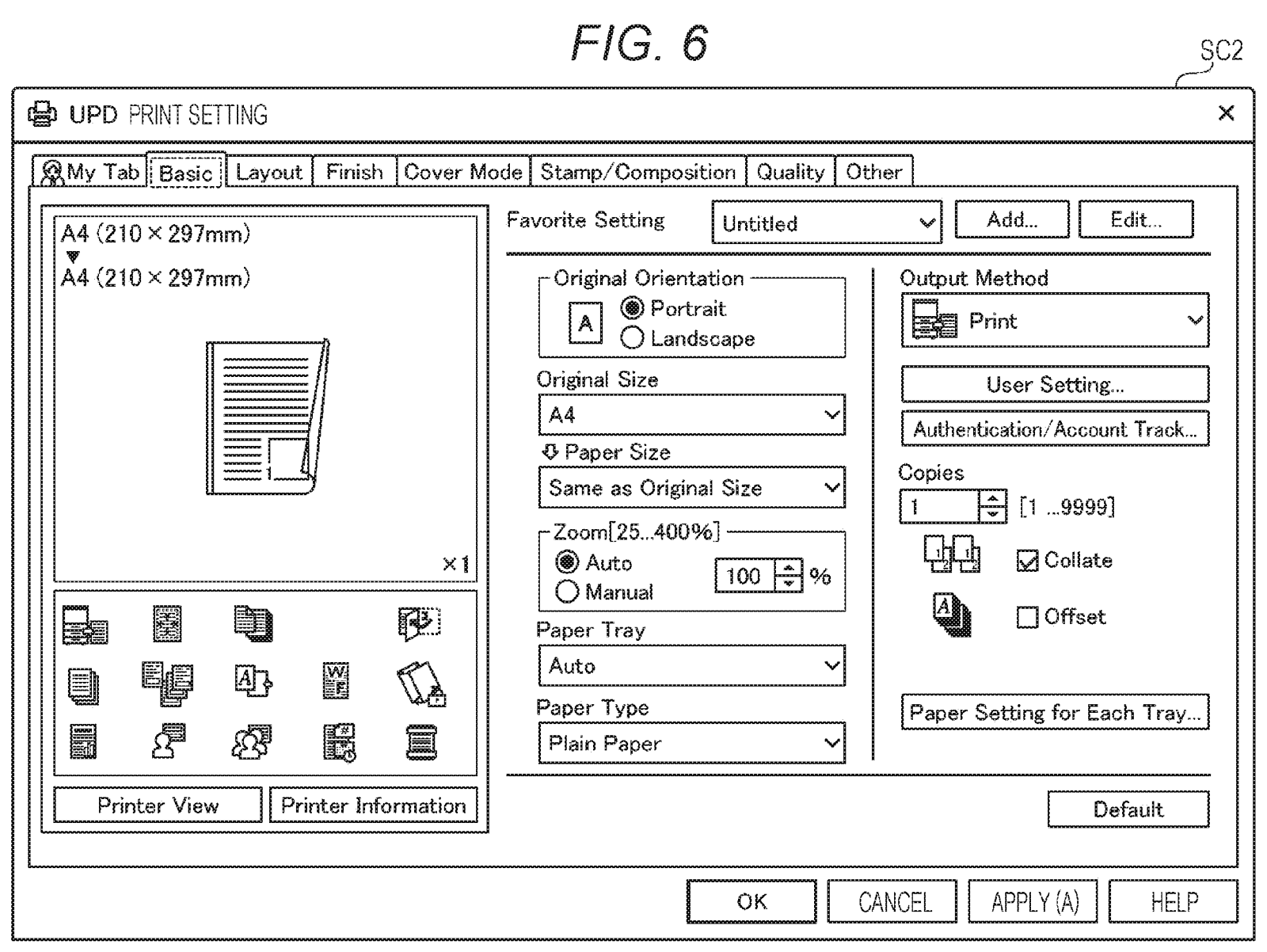

FIG. 6 illustrates an operation screen SC2 for the printer driver to be displayed on the display unit 107 when English is selected as a language to be used, in the first embodiment of the invention.

Referring to FIGS. 3 and 6, when character information of the selected language is contained in the language table, the CPU 101 performs language change based on the character information of the selected language in the language table. The CPU 101 refers to the character information of English in the language table, and changes the language to be used from Japanese to English for each text ID. As a result, the operation screen SC1 illustrated in FIG. 2 is changed to the operation screen SC2 illustrated in FIG. 6.

(Case Where Character Information of Selected Language is Not Contained in Language Table)

A case where German or Italian is selected as a language to be used will here be described.

Figure 7:
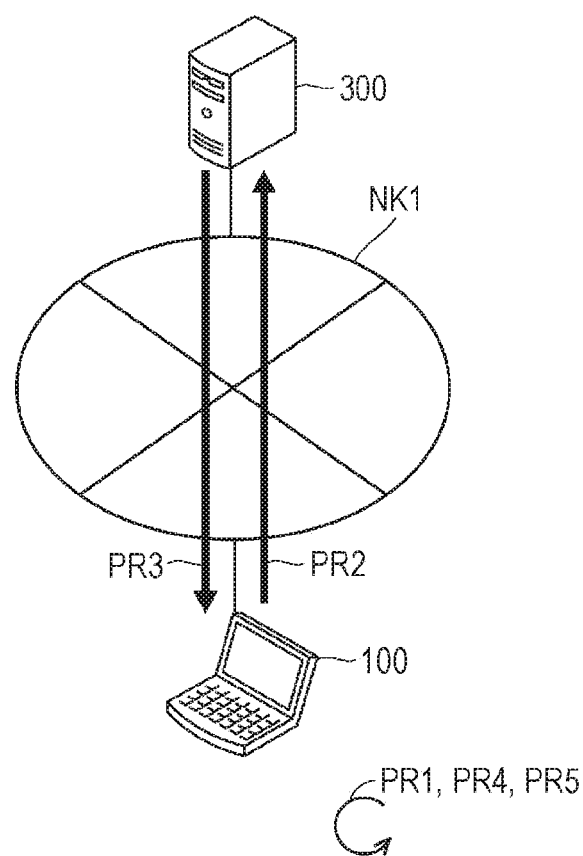
FIG. 7 conceptually illustrates the operations of the PC in the first embodiment of the invention.
Figure 9:
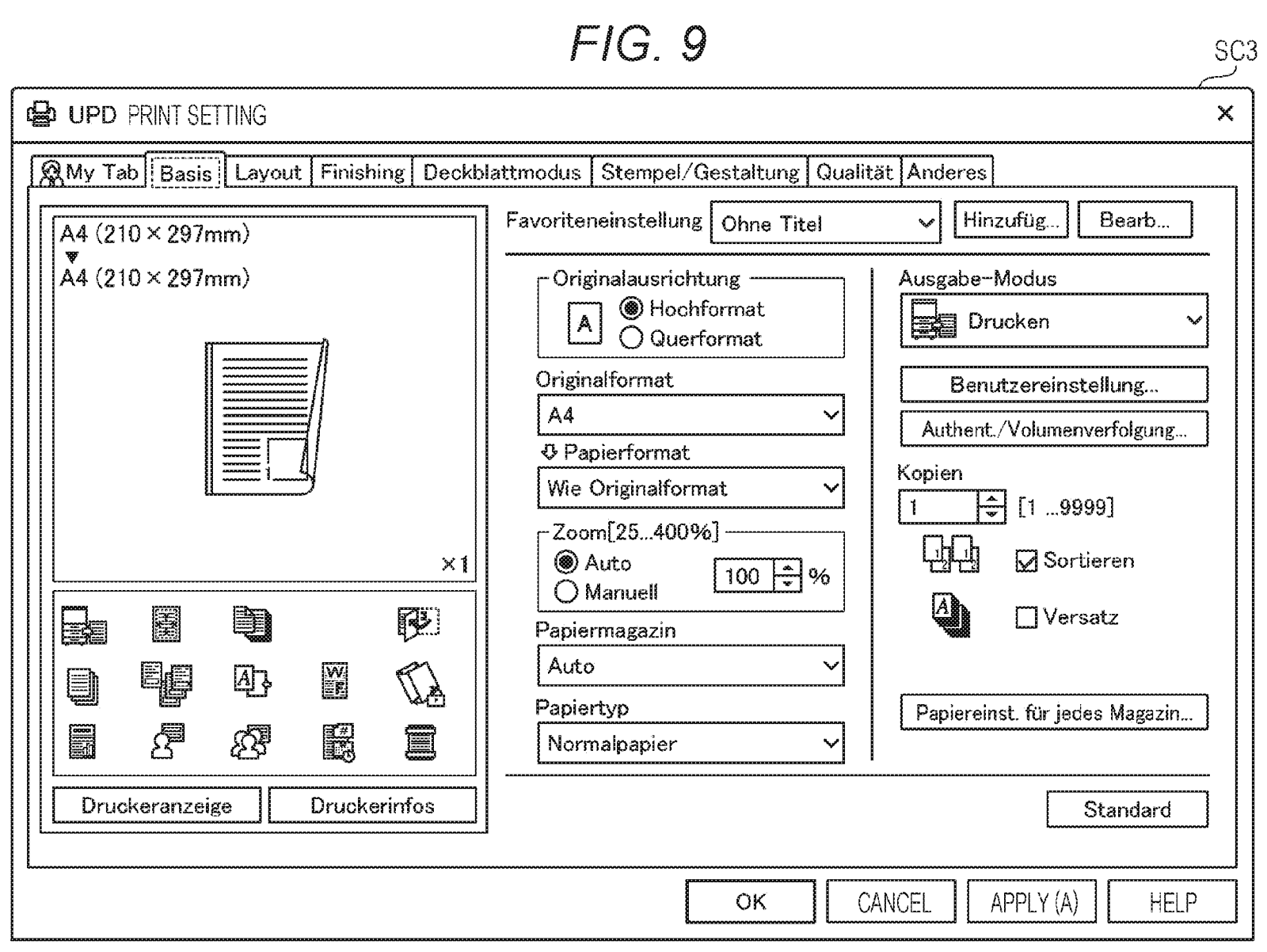

FIG. 7 conceptually illustrates the operations of the PC 100 in the first embodiment of the invention. FIG. 8 schematically illustrates a language table after character information of German is added in the first embodiment of the invention. FIG. 9 illustrates an operation screen SC3 for the printer driver to be displayed on the display unit 107 when a language to be used is changed to German, in the first embodiment of the invention.

Referring to FIG. 7, the PC 100 can mutually communicate with a translation server 300 (one example of servers) through an Internet NK1. The translation server 300 is an external server that provides translation service Google (registered trademark) translation and Microsoft (registered trademark) Translator).

When the character information of the selected language is a new language that is not included in the language table, the CPU 101 selects character information of at least one language from character information of basic language contained in the language table as a translation source (Processing PR1).

In the Processing PR1 the CPU 101 may determine whether a language belonging to the same language system as that of the selected language exists in the basic language by referring to the language-system table. The CPU 101 may select character information to be the translation source from the character information of the basic language based on the determination result.

Specifically, when character information of the language belonging to the same language system as that of the selected language exists, the character information of the language belonging to the same language system as that of the selected language may be selected as the translation source. When no character information of the language belonging to the same language system as that of the selected language exists, character information of two or more kinds of languages may be selected from the character information of the basic language as the translation source.

When the selected language is German, the character information of English is selected as the translation source since the character information of English belonging to the same language system as that of German exists in the language table.

The CPU 101 then requests the translation server 300 to translate the character information, which is to be the translation source, into the selected language (Processing PR2).

In the Processing PR2, the CPU 101 may change the format of the character information, which is to be the translation source, to another format in which the translation server 300 can perform translation (e.g., change the format from an Excel format to a CSV format), and request the translation server 300 to translate the character information after the format is changed.

When accepting a translation request from the PC 100, the translation server 300 translates the character information of the translation source into the selected language, and transmits the translation result to the PC 100. The PC 100 receives the translation result from the translation server 300 (Processing PR3).

When receiving the translation result, as illustrated in FIG. 8, the CPU 101 creates character information of the selected language based on the translation result, and adds the created character information to the language table (Processing PR4).

When selecting character information of two or more kinds of languages is selected as the translation source in the Processing PR1, the PC 100 receives a plurality of translation results from the translation server 300 in the Processing PR3. When the characters contained in the plurality of received translation results are different front each other, the CPU 101 is required to determine a character string to be contained in the character information of the selected language in any method in the Processing PR4. In one example, the CPU 101 may determine the most common character string (character string determined by majority vote) among character strings contained in the plurality of translation results as the character string to be contained in the character information of the selected language.

In the Processing PR4, the CPU 101 is not required to reflect the translation result of a character string, which has the same character information between two or more kinds of languages among the character information contained in the language table, in the created character information. This is because the character string, which has the same character information between two or more kinds of languages, is likely to be a product mime or a proper noun, and it is presumed to be preferable not to translate the character string.

A language other than the basic language among the languages of character information contained in the language table (i.e., a language of character information added to the language table) will hereinafter sometimes be referred to as an additional language.

As illustrated in FIG. 9, the CPU 101 then displays the operation screen for the printer driver in the selected language based on the character information of the selected language (Processing PR5).

FIG. 10 illustrates an operation screen SC1 for the printer driver to be displayed on the display unit 107 when Italian is selected as a language to be used, in the first embodiment of the invention.

Referring to FIG. 10, even when the selected language is Italian, character information of Italian is added to the language table in the same manner as that in the above-described pieces of Processing PR1 to PR5, and the operation screen for the printer driver is displayed in Italian. In the case, character information of French belonging to the same language system as that of Italian is selected as the translation source.

Even when the operation screen for the printer driver is displayed in the selected language and then display of the operation screen for the printer driver based on the character information of the selected language is ended, the character information of the selected language is not deleted from the language table. As a result, when the additional language is again selected as the language to be used on the operation screen for time printer driver, the PC 100 can display the operation screen for the printer driver in the selected additional language by referring to the language table without a translation request to the translation server 300.

The CPU 101 may update the character information of the additional language at necessary timing after adding the character information of the additional language to the language table. The necessary timing may be timing after a predetermined time period has passed since the character information of the additional language was added to time language table, may be timing when the number of displaying the operation screen for the printer driver has reached a predetermined number, or may be timing when the operation state of the PC 100 has shifted to a predetermined state.

When updating the character information of the additional language, the CPU 101 again requests time translation server 300 to translate the character information of the translation source into the selected language, and again receives the translation result from the translation server 300. The CPU 101 updates the character information of the additional language in the language table based on the received translation result.

Figure 11:
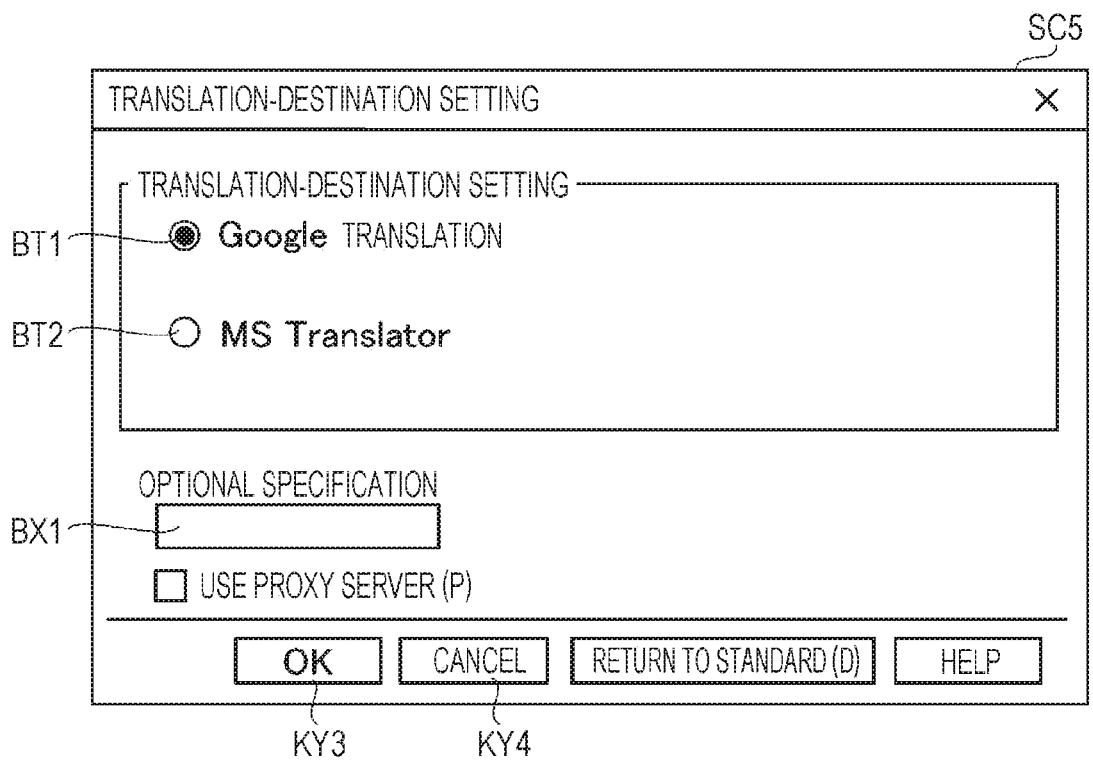
FIG. 11 illustrates a translation-destination setting screen displayed of the display unit in the first embodiment of the invention.

It should be noted that, for example, when accepting depression of the "Translation-Destination Setting" key KY3 on the language setting screen in FIG. 5, the CPU 101 may accept selection or entry of a translation destination from a user through a translation-destination setting screen SC5 as illustrated in FIG. 11.

FIG. 11 illustrates the translation-destination setting screen SC5 displayed on the display unit 107 in the first embodiment of the invention.

Referring to FIG. 11, the translation-destination setting screen SC5 includes radio buttons BT1 and BT2, a box BX1, an "OK" key KY3, and a "Cancel" key KY4. The radio buttons BT1 and BT2 accept selection of a translation destination from predetermined translation-destination candidates. The box BX1 accepts entry of any translation destination. The "OK" key KY3 confirms the selection or entry of the translation destination. The "Cancel" key KY4 is used for returning from the translation-destination setting screen SC5 to the language setting screen.

When accepting the depression of the "OK" key KY3, the CPU 101 sets the selected or entered server of the translation destination as the translation server 300 to which the translation is requested.

Furthermore, aside from the method of setting the translation destination illustrated in FIG. 11, the CPU 101 may request a plurality of servers providing translation service to perform translation, and create character information based on the translation result received from each of the servers.

Figure 12:
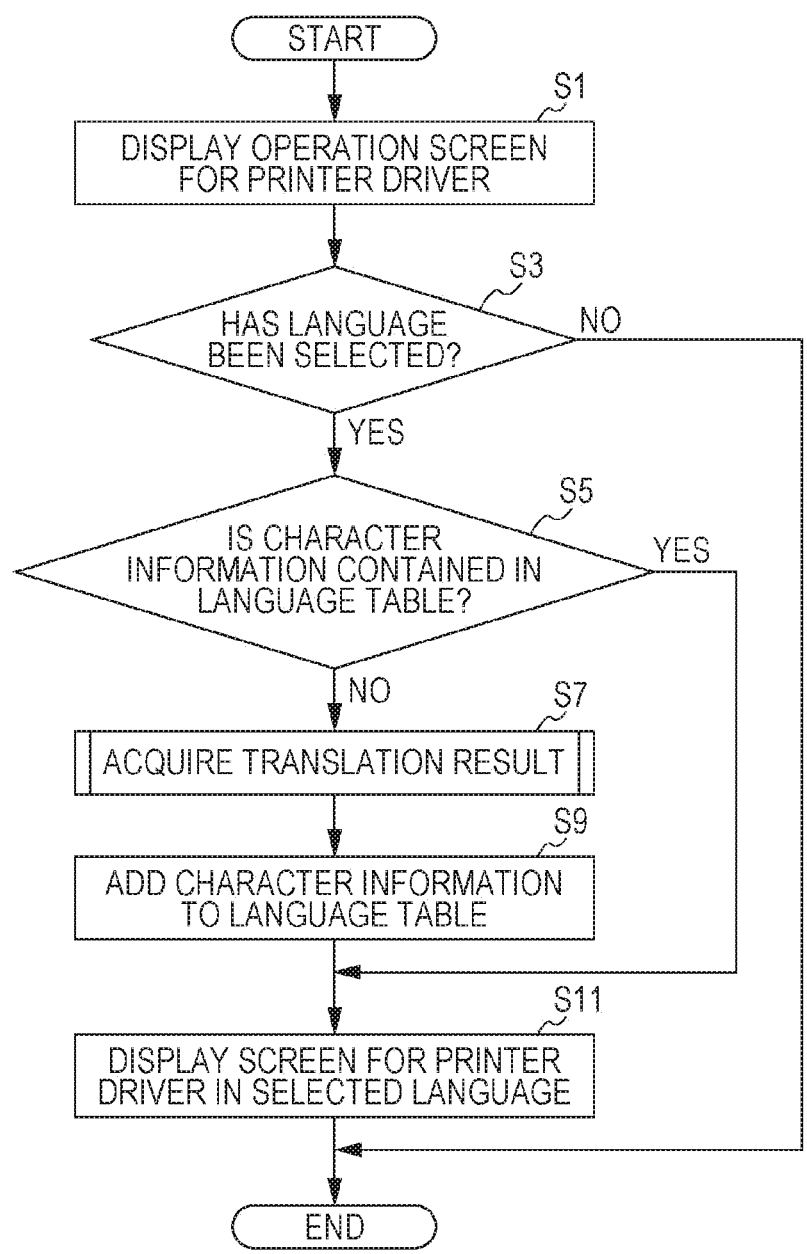
FIG. 12 is a flowchart illustrating the operation of the PC related to the display of the operation screen for the printer driver in the first embodiment of the invention.

FIG. 12 is a flowchart illustrating the operation of the PC 100 related to the display of the operation screen for the printer driver in the first embodiment of the invention.

Referring to FIG. 12, when accepting a predetermined operation, CPU 101 activates the printer driver, and displays the operation screen for the printer driver (S1). The CPU 101 determines whether selection of a language to be used on the operation screen for the printer driver has been accepted (S3).

When determining that the selection of a language to be used has not been accepted in step S3 (NO in S3), the CPU 101 ends the processing.

When determining that the selection of a language to be used has been accepted in step S3 (YES in S3), the CPU 101 determines Whether character information of the selected language is contained in the language table (S5).

When determining that the character information of the selected language is contained in the language table in step S5 (YES in S5), the CPU 101 proceeds to the processing of step S11.

When determining that the character information of the selected language is not contained in the language table in step S5 (NO in S5), the CPU 101 performs the later-described processing of acquiring a translation result while setting the selected language as an object language (S7), and adds character information created based on the acquired translation result to the language table (S9). The CPU 101 then proceeds to the processing of step S11.

In step S11, the CPU 101 displays the operation screen for the printer driver based on the character information of the selected language (S11), and ends the processing.

Figure 13:
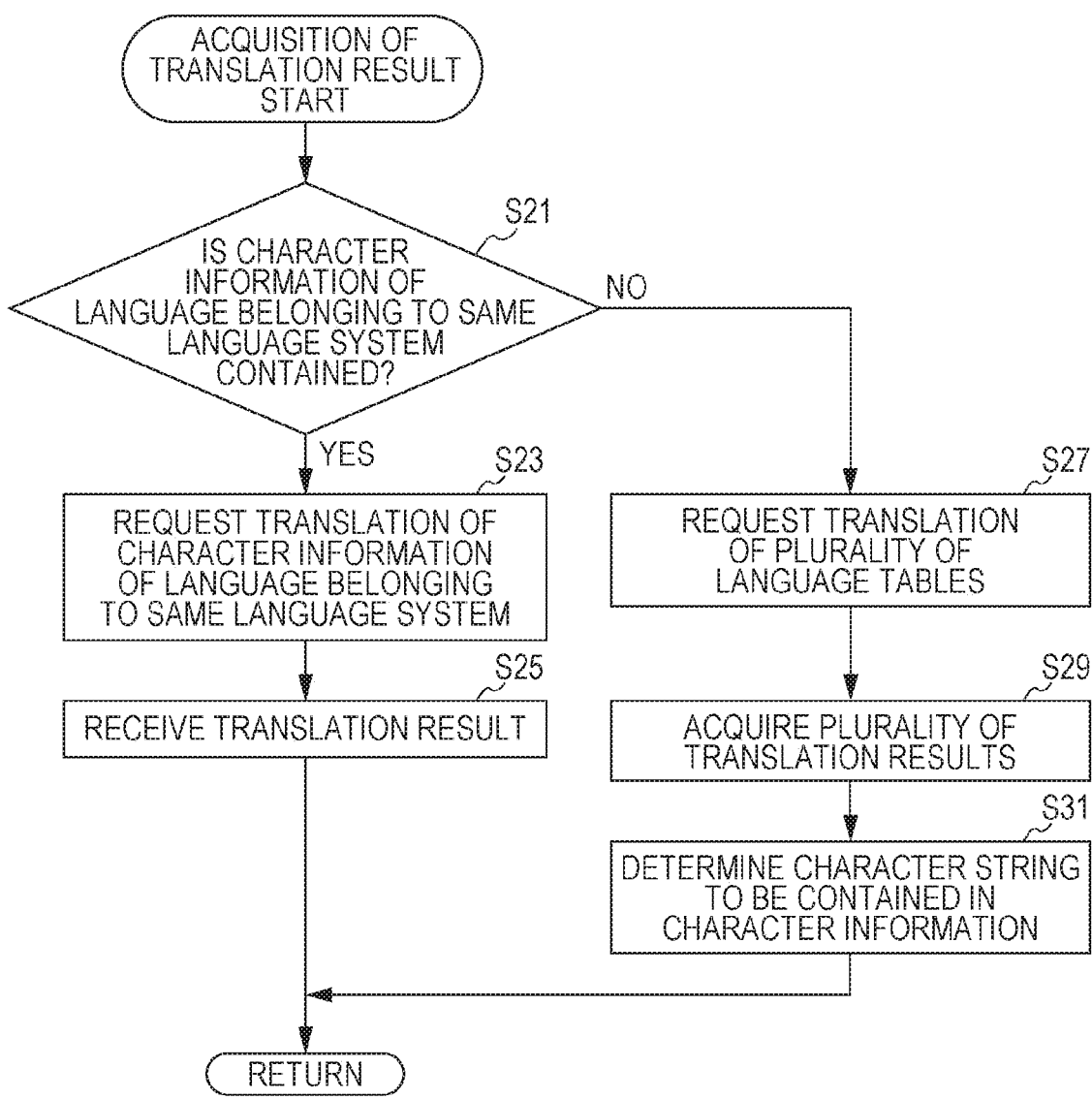
FIG. 13 is a subroutine of step S7 in FIG. 12 and step S43 in FIG. 14 in the first embodiment of the invention.
Figure 14:
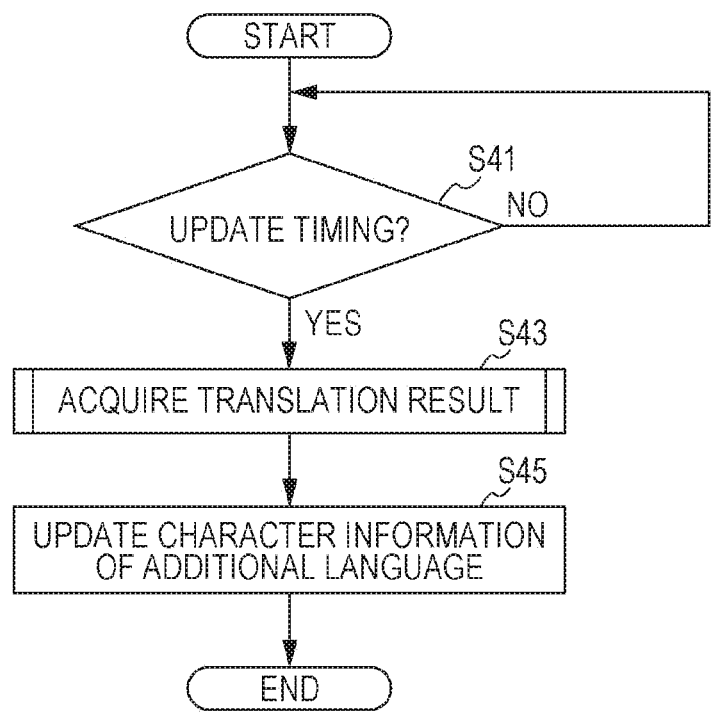
FIG. 14 is a flowchart illustrating the operation of the PC at the time of update of the character information in the first embodiment of the invention.

FIG. 13 is a subroutine of step S7 in FIG. 12 and step S43 in FIG. 14 in the first embodiment of the invention.

Referring to FIG. 13, the CPU 101 determines whether character information of a language belonging to the same language system as that of the object language is contained in the language table (S21).

When determining that the character information of a language belonging to the same language system as that of the object language is contained in the language table in step S21 (YES in S21), the CPU 101 requests the translation server 300 to translate the character information of the language belonging to the same language system as that of the object language (S23). The CPU 101 then receives the translation result of the object language from the translation server 300 (S25), and returns.

When determining that the character information of a language belonging to the same language system as that of the object language is not contained in step S21 (NO in S21), the CPU 101 requests the translation server 300 to translate a plurality of pieces of character information described in the language table (S27). The CPU 101 then receives a plurality of translation results of the object language from the translation server 300 (S29), determines a character to be contained in the character information of the object language based on the plurality of translation results (S31), and returns.

FIG. 14 is a flowchart illustrating the operation of the PC 100 at the time of update of the character information in the first embodiment of the invention.

Referring to FIG. 14, the CPU 101 determines whether update timing has been reached (S41). Until determining that the update timing has been reached, the CPU 101 repeats the processing of step S41.

When determining that the update timing has been reached in step S41 (YES in S41), the CPU 101 performs the processing of acquiring a translation result illustrated in FIG. 13 while setting the additional language as an object language (S43). The CPU 101 then updates the character information of the additional language based on the acquired translation result (S45), and ends the processing.

According to the embodiment, even when a language other than the basic language is selected as a language to be used for displaying the operation screen for the printer driver, the operation screen for the printer driver can be displayed in the selected language by using eternal translation service. This enables reduction of a data amount of character information described in the language table and display of the operation screen for the printer driver in various kinds of languages.

In addition, the character information created in the past by using the translation service is stored in the language table. When a language other than the basic language is again selected as the language to be used on the operation screen for the printer driver, the operation screen for the printer driver can thus be displayed in the selected language without a translation request to the translation server. This enables reduction of a communication amount between the PC 100 and the translation server 300 and improvement of display responses of the operation screen for the printer driver. This leads to improved convenience in displaying the screen.

Furthermore, the translation service provided by the translation server 300 is expected to have translation accuracy improved day by day. According to the embodiment, the character information of the additional language is updated at necessary timing, so that the translation accuracy in the case of displaying the operation screen for the printer driver in the additional language can be improved.

Second Embodiment

The configuration that is the premise in the embodiment will first be described.

Figure 15:
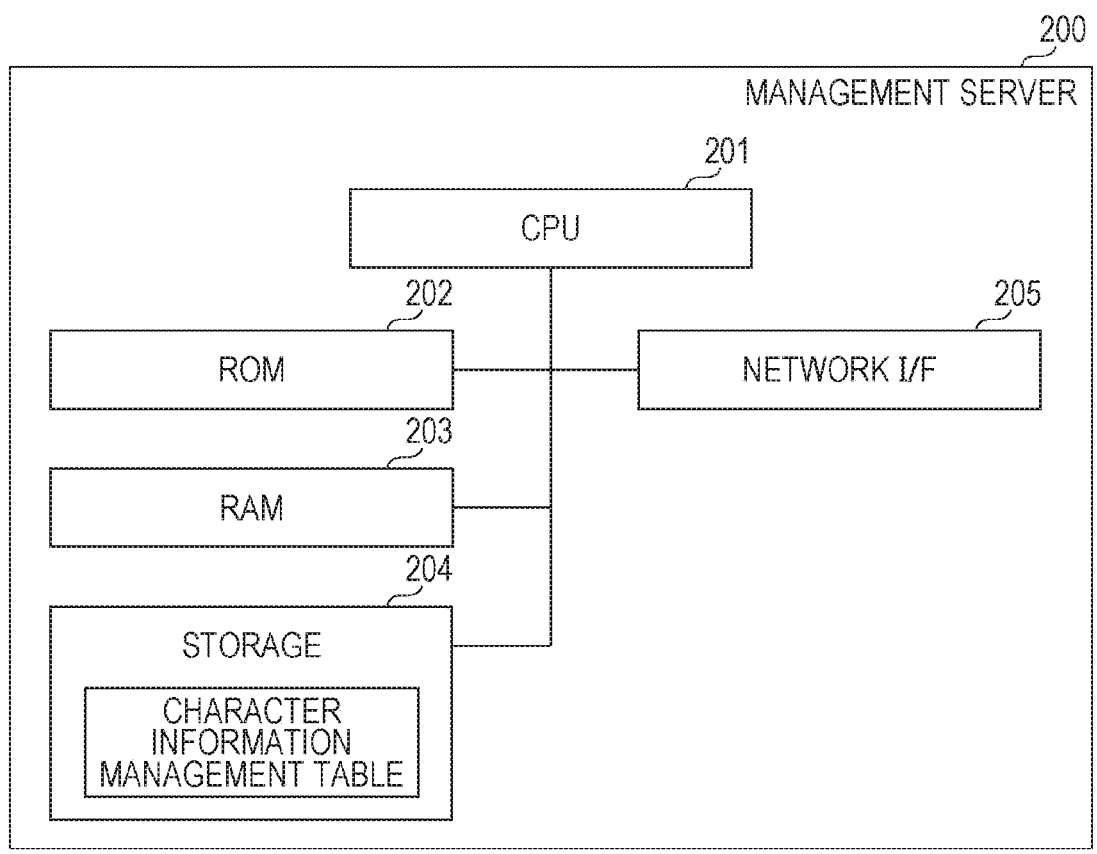
FIG. 15 is a block diagram illustrating the configuration of a management server in a second embodiment of the invention.

FIG. 15 is a block diagram illustrating the configuration of a management server 200 in a second embodiment of the invention.

Referring to FIG. 2, the management server 200 includes a CPU 201, a ROM 202, a RAM 203, a storage 204, and a network interface 205. The management server 200 is one example of servers. The CPU 201 is one example of a storage part and an updater. The network interface 205 is one example of a requirement acceptor, a requestor, a receiver, a transmitter, a re-requestor, and a re-receiver.

The CPU 201 controls the entire management server 200. The CPU 201 operates by executing a program stored in the ROM 202 and the storage 204.

The ROM 202 stores a program for operating the CPU 201.

The RAM 203 temporarily stores data necessary for the CPU 201 to operate the program.

The storage 204 includes an auxiliary storage such as an HDD, and stores various pieces of data such as a writing information management table.

The network interface 205 communicates with an external device through, for example, an intranet and the Internet.

Figure 16:
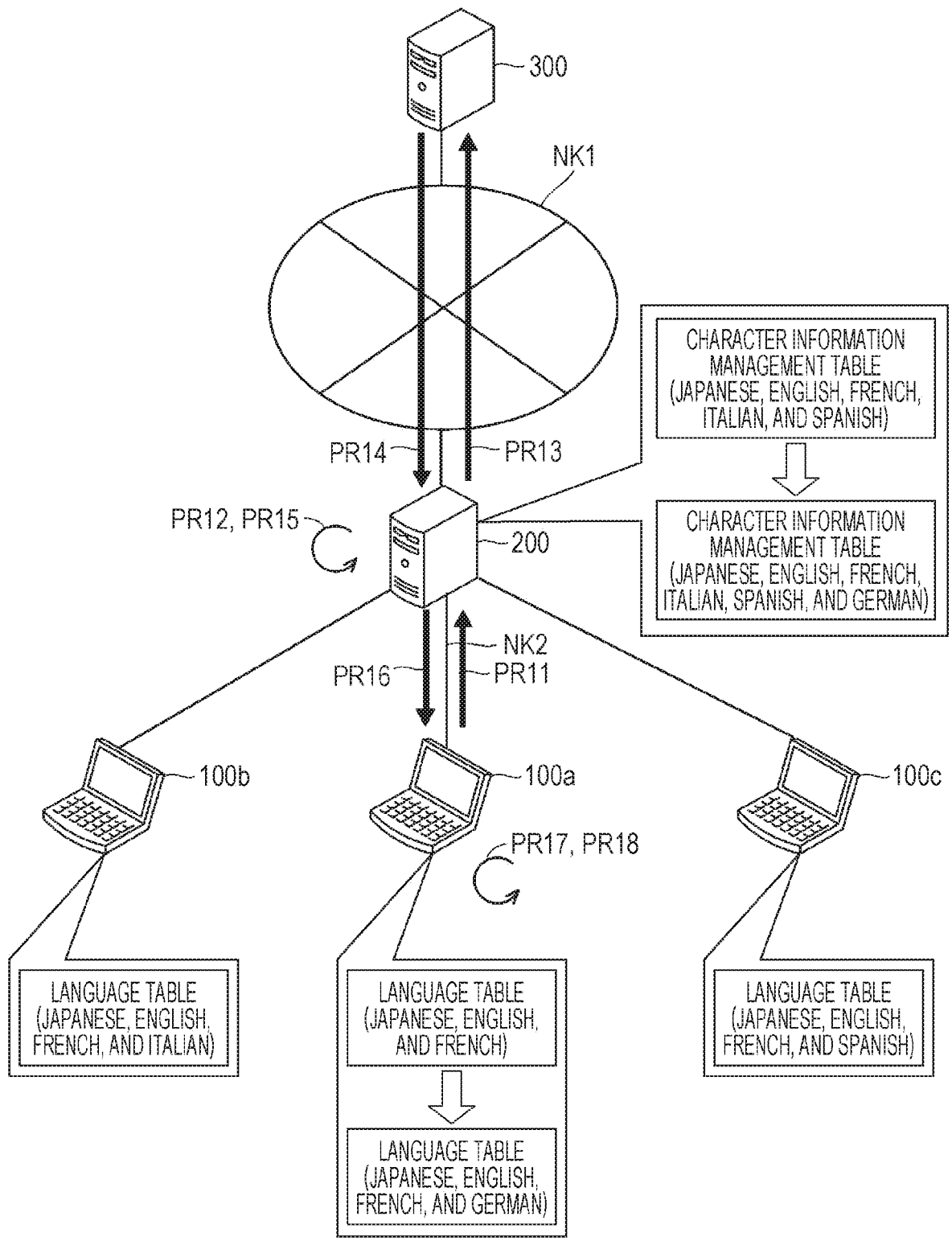
FIG. 16 conceptually illustrates operations of a PC and the management server in the second embodiment of the invention.

FIG. 16 conceptually illustrates the operations of a PC 100a and the management server 200 in the second embodiment of the invention.

Referring to FIG. 16, the PC 100a, a PC 100b, a PC 100c, and the management server 200 constitute display system in the embodiment.

The management server 200 can mutually communicate with a translation server 300 (one example of translation servers) through an Internet NK1. In addition, the management server 200 is connected to each of the PCs 100a, 100b, and 100c through an intranet NK2. Each of the PCs 100a, 100b, and 100c has the same configuration as the PC 100 in the first embodiment. A printer driver 104a is installed, in each of the PCs 100a, 100b, and 100c. Only character information of a basic language is described in a language table held by the PC 100a. In addition to the character information of the basic language, the character information of Italian is described as the character information of an additional language used in the past in a language table held by the PC 100b. In addition to the character information of the basic language, character information of Spanish is described as the character information of an additional language used in the past in a language table held by the PC 100c.

The management server 200 mediates creation of the character information of the additional language. A character information management table is stored in the storage 204 of the management server 200. Character information held by the PCs 100*a*, 100*b*, and 100*c*, which are connected to the management server 200 through the intranet NK2, is described in the character information management table. Specifically, in addition to the character information of the basic language, character information of Italian and Spanish is described as the character information of an additional language created in the past in the character information management table of the management server 200. The character information of Italian was used in the past in the PC 100*b*, and the character information of Spanish was used in the past in the PC 100*c*.

The operation of the PC 100*a* and the management server 200 in the embodiment will then be described.

When the character information of the selected language is a new language that is not contained in the language table of the own machine, the CPU 101 of the PC 100*a* requires the management server 200 to transmit the character information of the selected language (Processing PR11).

When accepting the requirement of transmitting the character information, the CPU 201 of the translation server 300 determines whether the character information of the required language is contained in the character information management table (Processing PR12).

When the character information of the required language is contained in the character information management table, the CPU 201 transmits character information of the required language to the PC 100*a* (Processing PR16).

When the character information of the required language is not contained in the character information management table, the CPU 201 requests the translation server 300 to set the character information of the basic language contained in the character information management table as a translation source and translate the character information of the translation source into the required language (Processing PR13).

When accepting a translation request from the management server 200, the translation server 300 translates the character information of the translation source into the required language, and transmits the translation result to the management server 200. The CPU 201 receives the translation result from the translation server 300 (Processing PR14).

When receiving the translation result, the CPU 201 creates character information of the selected language based on the translation result, and adds the created character information to the character information management table as the character information of the additional language. As a result, character information of German is added to the character information management table (Processing PR15).

The CPU 201 then transmits the character information of the selected language to the PC 100*a* (Processing PR16).

When receiving the character information of the selected language, the CPU 101 of the PC 100*a* adds the character information of the selected language to the language table. As a result, character information of German is added to the language table of the PC 100*a* (Processing PR17).

The CPU 101 of the PC 100*a* then displays the operation screen for the printer driver based on the character information of the selected language (Processing PR18).

The CPU 201 may update the character information of the additional language described in the character information management table at necessary timing after adding the character information of the additional language to the character information management table. The necessary timing may be timing after a predetermined time period has passed since the character information of the additional language was added to the character information management table, or may be timing when the operation state of the management server 200 has shifted to a predetermined state.

When updating the character information of the additional language, the CPU 201 again requests the translation server 300 to translate the character information of the translation source into the selected language, and again receives the translation result from the translation server 300. The CPU 101 updates the character information of the additional language in the character information management table based on the received translation result, and notifies the PC that has acquired the updated character information in the past of the update of the character information.

In the embodiment, the PC 100*a* basically operates in accordance with the flowchart illustrated in FIG. 12 when displaying the operation screen for the printer driver. In the embodiment, the PC 100*a* performs the following operations in the processing of acquiring the translation result in step S7 of FIG. 12.

Figure 17:
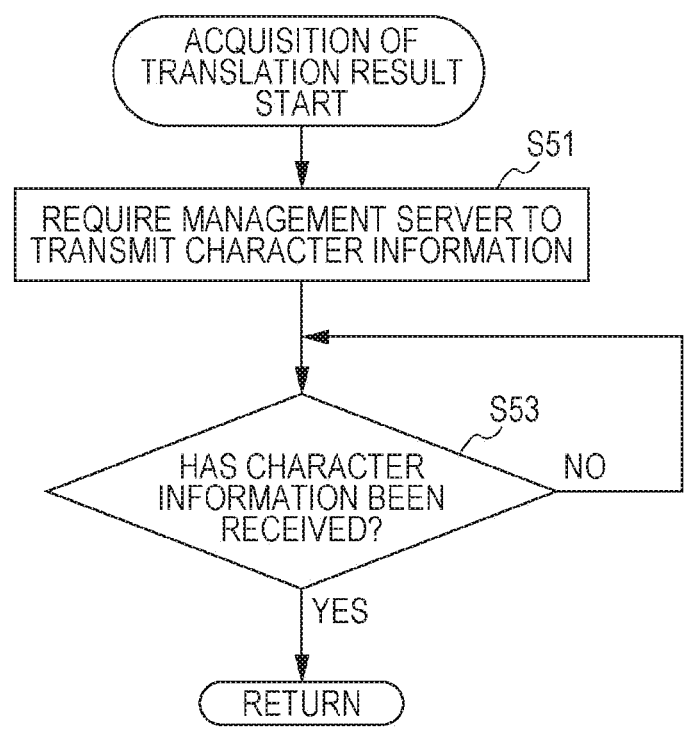
FIG. 17 is a subroutine of step S7 in FIG. 12 in the second embodiment of the invention.

FIG. 17 is a subroutine of step S7 in FIG. 12 in the second embodiment of the invention.

Referring to FIG. 17, the CPU 101 of PC 100*a* requires the management server 200 to transmit the character information of an object language (S51), and determines whether the character information of the object language has been received from the management server 200 (S53). The CPU 101 of the PC 100*a* repeats the processing of step S53 until determining that the character information of the object language has been received from the management server 200.

When determining that the character information of the object language has been received from the management server 200 in step S53 (YES in S53), the CPU 101 returns.

Figure 18:
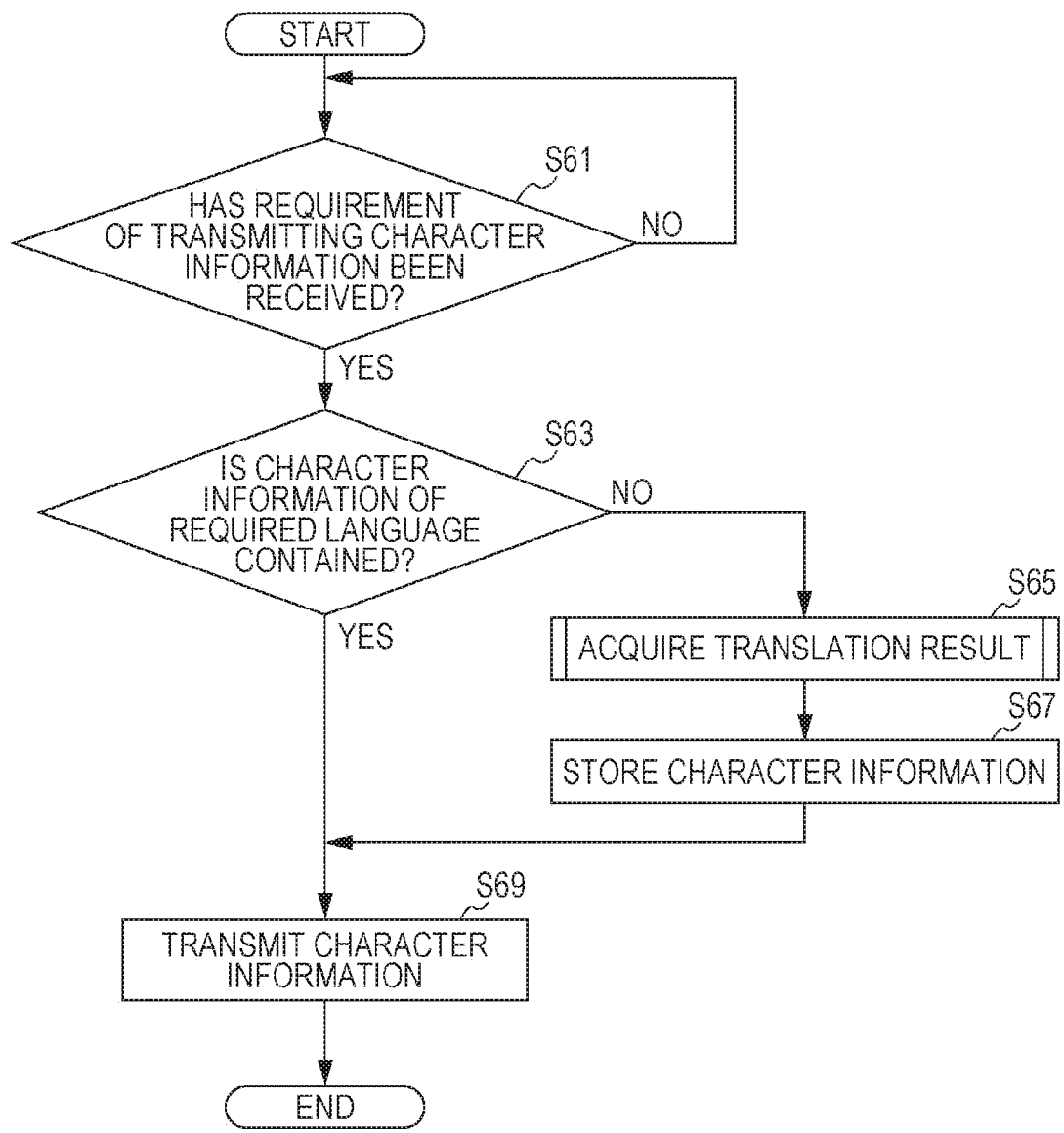
FIG. 18 is a flowchart illustrating the operation of the management server in the second embodiment of the invention.

FIG. 18 is a flowchart illustrating the operation of the management server 200 in the second embodiment of the invention.

Referring to FIG. 18, the CPU 201 of the management server 200 determines whether requirement of transmitting the character information has been received (S61). Until determining that the requirement of transmitting the character information has been received, the CPU 201 repeats the processing of step S61.

When determining that the requirement of transmitting the character information has been received in step S61 (YES in S61), the CPU 201 determines whether character information of the required language is contained in the character information management table (S63).

When determining that the character information of the required language is contained in the character information management table in step S63 (YES in S63), the CPU 201 transmits the character information of the required language to a PC that is the transmission source of the requirement of transmitting the character information (S69), and ends the processing.

When determining that the character information of the required language is not contained in the character information management table in step S63 (NO in S63), the CPU 201 performs the processing of acquiring a translation result in FIG. 13 (S65), and stores the character information created based on the translation result in the character information management table (S67). The CPU 201 then transmits the character information of the required language to the PC that is the transmission source of the requirement of transmitting the character information (S69), and ends the processing.

According to the embodiment, the character information of the additional language can be unitarily managed by the management server 200, and can be shared in the display system. This results in reduction of a communication amount between the display system and the translation server 300 and improvement in the processing speed of displaying the operation screen for the printer driver.

In addition, the character information of the additional language is updated at necessary timing, so that the translation accuracy in the case of displaying the operation screen for the printer driver in the additional language can be improved.

[Other]

The screen displayed by the display is not limited to the operation screen for the printer driver, but may be any screen containing a character.

The processing in the above-described, embodiment may be performed by software or with a hardware circuit. In addition, a program for performing the processing in the above-described embodiment and variations can be provided. The program may be stored in a recording medium such as a CD-ROM, a flexible disk, a hard disk, a ROM, a RAM, and a memory card to be provided to a user. The program is executed by a computer such as a CPU. In addition, the program may be downloaded to an apparatus through a communication line such as the Internet.

Although embodiments of the present invention have been described and illustrated in detail, the disclosed embodiments are made for purposes of illustration in all respects and example only and not limitation. The scope of the present invention should be interpreted by terms of the appended claims.

What is claimed is:

1. A display capable of communicating with a server, comprising:
   an auxiliary storage that stores character information of a specific language, the character information including a character string contained in a screen when the screen is displayed;
   an acceptor that accepts selection of a language to be used in displaying the screen;
   a receiver that receives a translation result obtained by translating the character information of the specific language into a new language from the server when the language, selection of which has been accepted by the acceptor, is the new language different from the specific language;
   a hardware processor that stores, in the auxiliary storage, character information of the new language, the character information being created based on the translation result received by the receiver; and
   a display part that displays the screen based on the character information of the new language;
   wherein the hardware processor stores, in the auxiliary storage, the character information of the new language such that the character information of the new language can be used again when the new language is again selected as the language to be used on the operation screen.

2. The display according to claim 1, further comprising a requestor that requests the server to translate the character information of the specific language into the new language when the language, selection of which has been accepted by the acceptor, is the new language.

3. The display according to claim 2, further comprising:
   a re-requestor that again requests the server to translate the character information of the specific language into the new language after the hardware processor stores the character information of the new language; and
   a re-receiver that receives a translation result obtained by translating the character information of the specific language into the new language from the server when the re-requestor again performs a request,
   wherein the hardware processor updates the character information of the new language stored in the auxiliary storage based on the translation result received by the re-receiver.

4. The display according to claim 2,
   wherein the auxiliary storage stores character information of a plurality of kinds of languages as the character information of the specific language,
   the hardware processor determines whether a language belonging to the same language system as a language system of the new language exists in the specific language when the language, selection of which has been accepted by the acceptor, is the new language, and
   the requestor selects character information to be a translation source from the character information of the specific language based on a determination result from the hardware processor.

5. The display according to claim 4, wherein the requestor includes a first requestor that requests the server to translate character information of a language belonging to the same language system as a language system of the new language into the new language when the hardware processor determines that the language belonging to the same language system as the language system of the new language exists in the specific language.

6. The display according to claim 4, wherein the requestor includes a second requestor that requests the server to translate character information of two or more kinds of languages among the character information of the specific language into the new language when the hardware processor determines that the language belonging to the same language system as the language system of the new language does not exist in the specific language.

7. The display according to claim 2,
   wherein the hardware processor changes a format of the character information of the specific language when a language, selection of which has been accepted by the acceptor, is a new language different from the specific language, and
   the requestor requests the server to translate the character information of the specific language after the format is changed into the new language.

8. The display according to claim 1,
   wherein the auxiliary storage stores character information of a plurality of kinds of languages as the character information of the specific language, and
   the hardware processor does not reflect a translation result, which has been received by the receiver, of a character string having the same character information between two or more languages among the character information of the specific language to the character information of the new language.

9. The display according to claim 1, wherein the receiver further includes a requirer that requires the server to transmit the character information of the new language when the language, selection of which has been accepted by the acceptor, is the new language.

10. The display according to claim 1, further comprising another display part that displays the screen based on the character information of the specific language when the language, selection of which has been accepted by the acceptor, is the specific language.

11. A server capable of communicating with a display and with a translation server, comprising:
   an auxiliary storage that stores character information of a specific language, the character information including a character string contained in a screen when the screen is displayed by the display;
   a requirement acceptor that accepts requirement of transmitting character information of a new language different from the specific language from the display;
   a requestor that requests the translation server to translate the character information of the specific language into the new language when the requirement acceptor accepts the requirement;
   a receiver that receives a translation result obtained by translating the character information of the specific language into the new language from the translation server;
   a hardware processor that stores character information of the new language formed based on the translation result received by the receiver in the auxiliary storage; and
   a transmitter that transmits the character information of the new language to the display;
   wherein the hardware processor stores, in the auxiliary storage, the character information of the new language such that the character information of the new language can be used again when the new language is again selected as the language to be used on the operation screen.

12. The server according to claim 11, further comprising:
   a re-requestor that again requests the translation server to translate the character information of the specific language into the new language after the hardware processor stores the character information of the new language; and
   a re-receiver that receives a translation result obtained by translating the character information of the specific language into the new language from the translation server when the re-requestor again performs a request,
   wherein the hardware processor updates a language table of the new language based on the translation result received by the re-receiver, the language table being stored in the auxiliary storage.

13. A non-transitory recording medium storing a computer readable control program for a display capable of communicating with a server,
   the display including an auxiliary storage that stores character information of a specific language, the character information including a character string contained in a screen when the screen is displayed,
   the control program causing a computer to perform:
   accepting selection of a language to be used in displaying the screen;
   receiving a translation result obtained by translating the character information of the specific language into a new language from the server when the language, selection of which has been accepted in the accepting, is the new language different from the specific language;
   storing, in the auxiliary storage, character information of the new language, the character information being created based on the translation result received in the receiving; and
   displaying the screen based on the character information of the new language;
   wherein the computer stores, in the auxiliary storage, the character information of the new language such that the character information of the new language can be used again when the new language is again selected as the language to be used on the operation screen.

14. A non-transitory recording medium storing a computer readable control program for a server capable of communicating with a display and with a translation server,
   the server including an auxiliary storage that stores character information of a specific language, the character information including a character string contained in a screen when the screen is displayed by the display,
   the control program causing a computer to perform:
   accepting requirement of transmitting character information of a new language different from the specific language from the display;
   requesting the translation server to translate the character information of the specific language into the new language when the requirement is accepted in the accepting;
   receiving a translation result obtained by translating the character information of the specific language into the new language from the translation server;
   storing character information of the new language created based on the translation result received in the receiving in the auxiliary storage; and
   transmitting the character information of the new language to the display;
   wherein the computer stores, in the auxiliary storage, the character information of the new language such that the character information of the new language can be used again when the new language is again selected as the language to be used on the operation screen.

* * * * *